United States Patent [19]
Zabala

[11] Patent Number: 4,987,880
[45] Date of Patent: Jan. 29, 1991

[54] GRILL GRATE COVER

[76] Inventor: Edilberto M. Zabala, 13723 Arapaho St., Fontana, Calif. 92336

[21] Appl. No.: 526,376

[22] Filed: May 21, 1990

[51] Int. Cl.⁵ .......................... A47J 37/00; F24B 3/00
[52] U.S. Cl. .................................. 126/25 R; 126/332; 99/444
[58] Field of Search ................ 126/25 R, 211, 214 D, 126/220, 221, 332, 337 R, 152 B; 211/134, 181, 175, 186, 189, 198; 108/102; 211/189, 198; 99/444

[56] References Cited

U.S. PATENT DOCUMENTS

| 1,830,230 | 11/1931 | Gwyer | 126/9 B |
| 3,082,757 | 3/1963 | Hohe | 126/25 R |
| 3,404,671 | 10/1968 | Wasserman | 126/25 R |
| 3,424,145 | 1/1969 | Stitt | 126/25 R |
| 3,555,994 | 1/1971 | Nemetz | 126/25 R X |
| 4,553,523 | 11/1985 | Stohrer, Jr. | 126/9 B |
| 4,688,543 | 8/1987 | Kopke | 126/25 R |

Primary Examiner—Larry Jones
Attorney, Agent, or Firm—Allan M. Shapiro

[57] ABSTRACT

In grilling foods, a grate is placed over the heat source. Foods are placed on the grate for cooking. The grill grate cover of this invention comprises disposable, heat-proof tubes which removably slip onto the grate bars. After use, they are removed, thrown away, and replaced.

16 Claims, 2 Drawing Sheets

GRILL GRATE COVER

FIELD OF THE INVENTION

This invention is directed to a grill upon which food can be cooked, with the grate of the grill specially configured so that the grate bars are accessible. Throwaway tubes are placed on the grate bars during use and disposed of after use.

BACKGROUND OF THE INVENTION

Grills are often used for the cooking of food. Grills are characterized by a grate which supports food for cooking and characterized by a heat source adjacent, usually below, the grate to supply radiant and convective heat to the food. The food is necessarily in contact with the grate, and during cooking, its juices adhere to the grate. When the cooking is done, the grate carries food products thereon. Cleaning is necessary to eliminate the leftover food matter. The usual food is meat, but other foods also leave residue on the grate. It would be desirable to eliminate the cleaning step, but retain the clean state of the grill grate.

SUMMARY OF THE INVENTION

In order to aid in the understanding of this invention, it can be stated in essentially summary form that it is directed to a grill grate cover, where the grill grate includes a plurality of grate bars, spaced from each other to support food. The grate bars are secured to a grate frame, and the grate frame has hinges therein to permit access to one end of each of the grate bars. A tube is slipped over the end of each grate bar, and the frame is rotated on its hinge back to a flat position where the grate can rest within the grill with the covers on the grate bars. The covers are disposable to permit maintenance of cleanliness of the grill grate.

It is, thus, an object and advantage of this invention to provide a grill grate cover wherein replaceable tubes are removably placed upon grate bars so that the tubes can be put in place before use and removed after use to maintain cleanliness of the grate bars.

It is a further object and advantage of this invention to provide a system whereby a grill grate can economically and easily be provided with a cover to maintain cleanliness of the grate.

It is another object and advantage of this invention to provide a grill grate cover wherein the grate frame is hinged and grate bars are secured to the hinge frame so that, when the frame is in the flat position, the bars are supported and, when the grate is in its hinged, open position, the ends of the grate bars are accessible for placement of and removal of grate bar covers.

It is further object and advantage of this invention to provide a grill grate cover which is useful in different sizes and shapes of grill grates so that different configurations of grills can receive a grate suitable for covering, in accordance with this invention.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENTS

Figure 1:
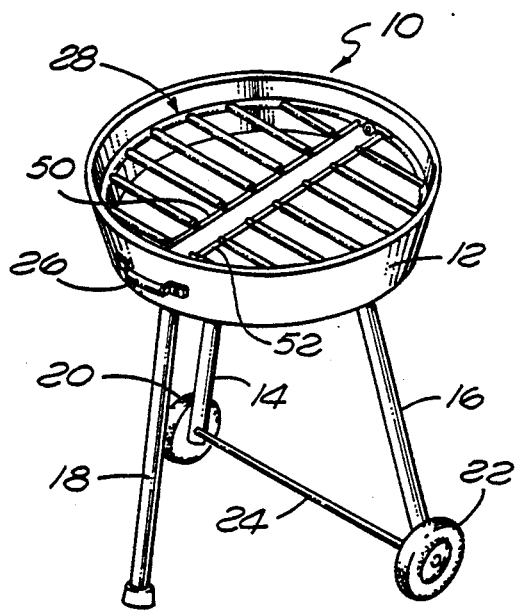
FIG. 1 is a perspective view of a grill having a grate in accordance with this invention, which is suitable for covering, together with covers on the grate bars thereof.

A grill 10 is illustrated in FIG. 1. The grill 10 is an example of various different styles of grills which are employed for the grilling of various foodstuffs. Grill 10 has a bowl 12 which is carried on suitable supports. In this case, the supports comprise legs 14, 16 and 18. Legs 14 and 16 are provided with wheels 20 and 22 mounted on axle 24. By this construction, the grill 10 may be moved into place on its wheels by grasp of handle 26. Bowl 12 has a heat source therein. Quite often, the heat source is burning charcoal. In some grills, a gas flame heats ceramic material which acts as a radiant and convective heat source. Sometimes, the heat source is electric. In any event, grate 28 is mounted in the bowl. Conventionally, the grate 28 is mounted on a flange or a series of angle stops mounted around the interior of the bowl just below the top thereof. A cover may be provided. While a circular bowl is illustrated and its appearance is one suitable for use with charcoal as a heat source, it is understood that other configurations and heat sources for the grill are grills suitable for use with the grate 28 of this invention.

Figure 2:
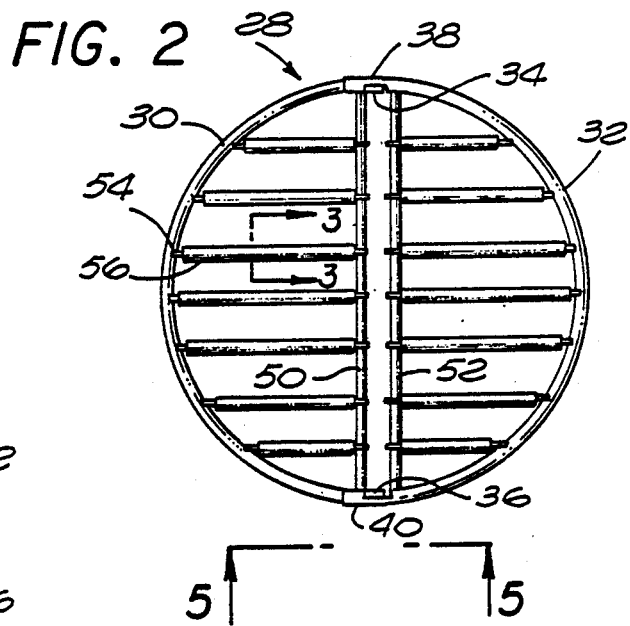
FIG. 2 is an enlarged plan view of the grate itself.
Figure 5:
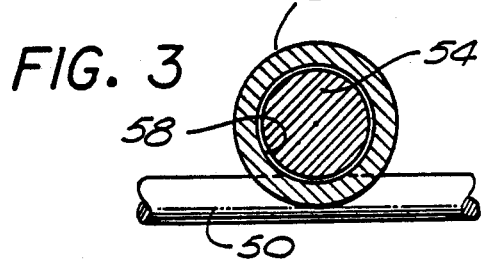
FIG. 5 is an enlarged side-elevational view of the hinge in the straight position, with parts broken away.
Figure 6:
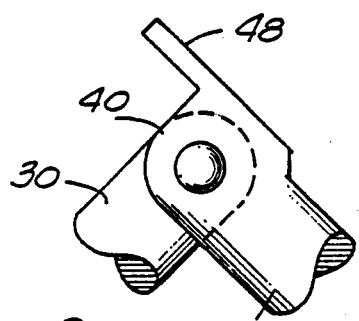
FIG. 6 is a view similar to FIG. 5 showing the hinge in the hinged position.

Grate 28 has two half-circular grate frames 30 and 32, see FIG. 2. The grate frames 30 and 32 overlap each other and are conveniently formed with flats and pivot bosses. Pivot bosses 34 and 36 are illustrated on grate frame 30, while pivot bosses 38 and 40 are illustrated on grate frame 32, see FIGS. 2 and 4. The pivot bosses are respectively provided with pivot openings. Pivot pins 42 and 44 are respectively engaged in the pivot openings in pivot bosses 34 and 38 and in the pivot openings in pivot bosses 36 and 40, see FIG. 4. This construction permits the grate frames 30 and 32 to move from a flat, planar position, as shown in FIGS. 1, 2 and 5, to a folded position, shown in FIGS. 4 and 6. To limit the pivotability and to limit the hinging to the planar position in one direction of relative rotation, stop flanges 46 and 48 are respectively formed on pivot bosses 38 and 40. This construction and the manner in which the stop flanges limit the relative rotation of the grate frames to the planar position are shown in FIGS. 5 and 6.

Figure 3:
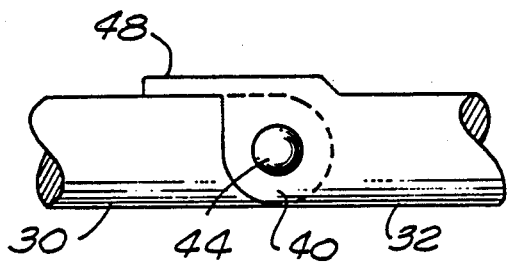
FIG. 3 is an enlarged detail, as seen generally along line 3—3 of FIG. 2, with parts broken away.

Crossbars 50 and 52 are attached to the grate frames 30 and 32, respectively, adjacent their hinges. As seen in FIG. 2, the combination of the two grate frames hinge together form a circular grate 28, and the crossbars 50 and 52 form chords close together across the circular grate frame. A plurality of grate bars is secured to the grate frames and extend to and lie on top of the crossbars. For example, grate bar 54 is attached to the grate frame 30 on its outer end and lies on top of crossbar 50 on its inner end, see FIGS. 2 and 3. A sufficient plurality of grate bars, such as grate bar 54, are spaced from each other and parallel to each other and substantially perpendicular to the crossbars 50 and 52, as seen in FIG. 2. These grate bars are sufficiently close that there is little risk of food materials falling between, but there is substantial room for radiation and convection therebetween.

The covers for these grate bars are throwaway tubes. One of the covers is specifically shown and is identified as cover 56 in FIGS. 2, 3 and 4. Cover 56 is an example of all the covers employed, one for each grate bar. The cover 56 and its companions are made of material which does not harm the food which lies thereagainst, is of a material which is sufficiently economic so that it can be thrown away after one usage, and is sufficiently temperature-resistant so that it does not significantly melt or deform in the heat of cooking. An aluminum foil tube is suitable and is the preferred material. Cover 56 is in the form of a tube which has an interior opening 58, which is sufficiently large to receive the grate bar. The length of the cover 56 is sufficient to reach substantially from the crossbar to the grate frame, as seen in FIG. 2.

Figure 4:
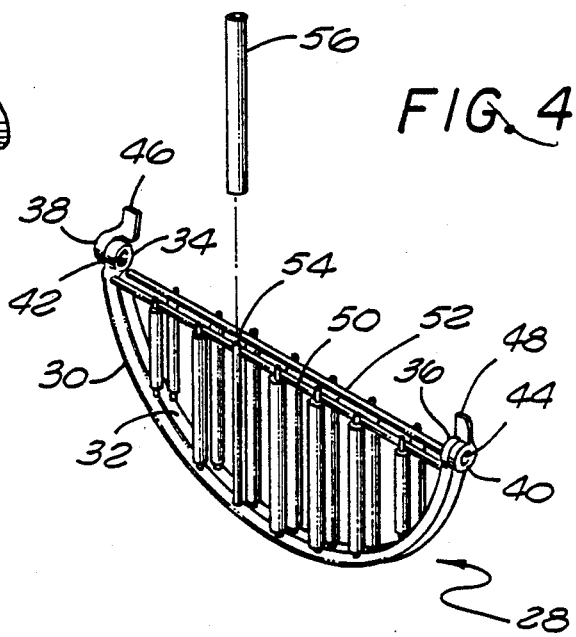
FIG. 4 is an isometric view of the grill grate of FIG. 1 in the folded position and showing the manner in which the grate bar covers are installed and removed.

For installation and removal of the covers from the grate bars, the grate is folded, as shown in FIG. 4. This exposes the free ends of the grate bars. The covers 56 are slipped thereon, as shown for the exploded position of the cover 56 in FIG. 4. If necessary, the grate bars can be pushed slightly away from the crossbars during the installation. The fact that the grate bars normally lie against the crossbars retains the covers in place. When all of the covers are installed, the grate is folded flat, as shown in FIG. 2, and is placed upon the grill, as shown in FIG. 1. After the covered grill grate is used, it can be removed, folded to the position of FIG. 4, and the old covers 56 can be removed and disposed of while new covers are put in place. In this way, the grill grate is replaced to maintain the grill grate clean and ready for use.

Figure 7:
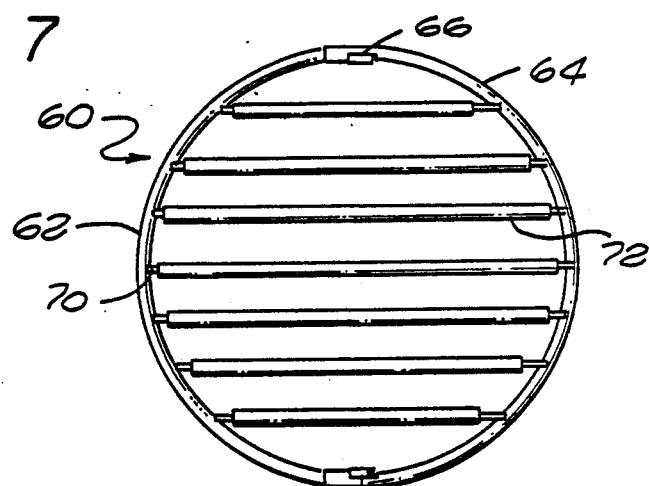
FIG. 7 is a plan view of a grill grate, together with covers on the grate bars, of a second preferred embodiment of this invention.

A second preferred embodiment of the grill grate and its cover is generally indicated at 60 in FIG. 7. The grate 60 has two grate frames 62 and 64, which are the same size and shape as the grate frames 30 and 32. The grate frames 60 and 62 are pivoted together on hinges 66 and 68 of the same construction as the flattened pivot bosses and stop flanges described with respect to FIGS. 5 and 6. The important difference of the grate 60 is that its grate bars are all secured at one end to the grate frame 62. For example, grate bar 70 is secured to grate frame 62. When the grate frame 64 is hinged into planar position, as shown in FIG. 6, the free ends of the grate bars lie on top of the grate frame 64, as shown. When the grate frame 64 is swung down on its hinged pivots, the right ends of the grate bars are free and unobstructed. Covers, such as cover 72 on grate bar 70, may then be slid into position when clean and out of position when used so as to provide ready access to the grate bars for replacement of the covers.

Again, the covers are preferably of lightweight aluminum tubing so that they resist the heat, can be thrown away, and do not adversely affect the food cooked thereon. The grate bars 70 are parallel to each other and are substantially perpendicular to the axis through the hinges. The grate bars are spaced from each other suitably to support food, but permit passage of radiation and convective heat therebetween.

Figure 8:
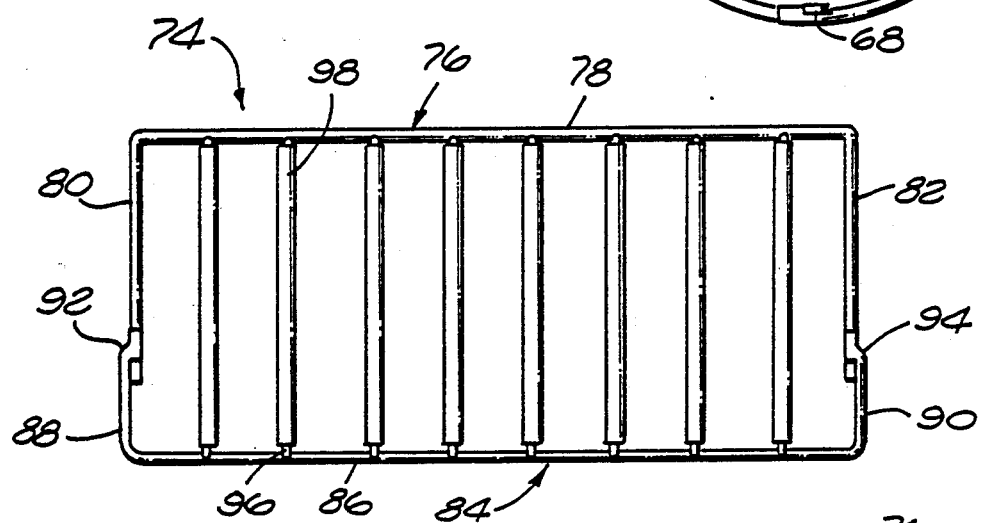
FIG. 8 is a plan view of a third preferred embodiment of a grill grate having grate bar covers, in accordance with this invention.
Figure 9:
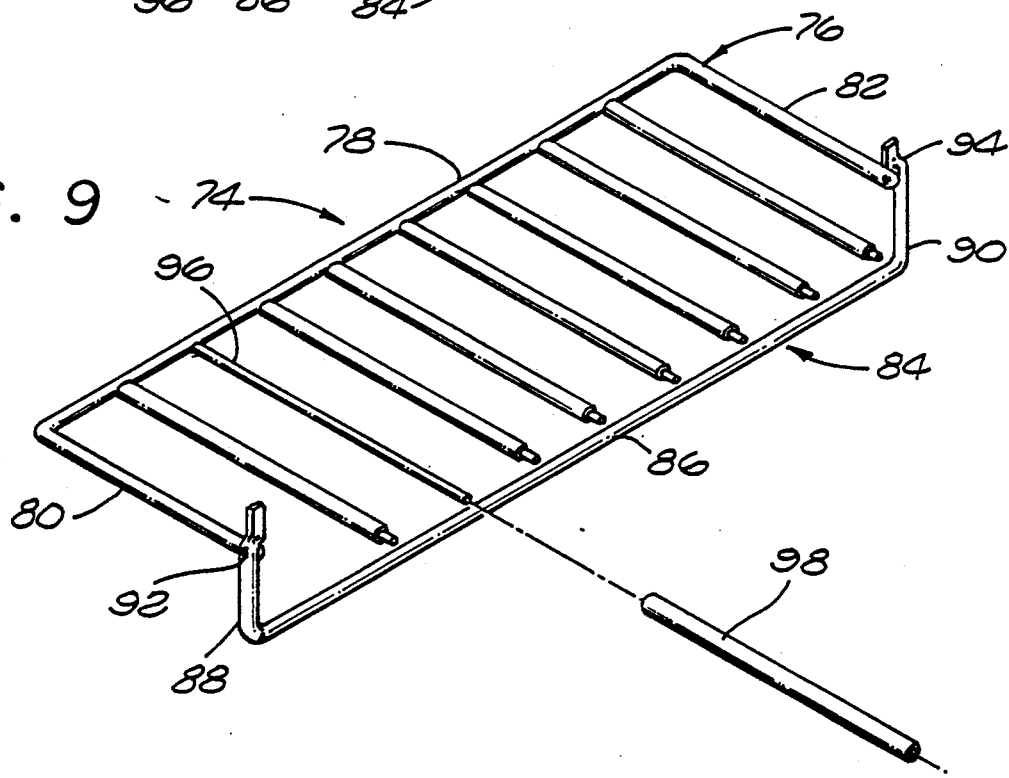
FIG. 9 is an isometric view of the grate of FIG. 8, shown in the hinged position.

The third preferred embodiment of the grill grate and cover of this invention is generally indicated at 74 in FIGS. 8 and 9. The grate 74 is very similar to the grate 60, except for the fact that the grate frames form a rectangular grate and the grate bars are of equal length. Grate frame 76 is formed of main bar 78 and side bars 80 and 82. Grate frame 84 is formed of main bar 86 and side bars 88 and 90. Side bar 88 is hinged to side bar 80 at hinge 92, while side bar 90 is pivoted to side bar 82 at hinge 94. The hinges are the same as those shown in FIGS. 5 and 6, including stops to limit the hinging of main bar 86 up from the depressed position shown in FIG. 9 to the planar position shown in FIG. 8. Each of the grate bars of a plurality of parallel grate bars is attached to the main bar 78.

As is seen in FIG. 9, grate bar 96 is secured to main bar 78. As seen in FIG. 8, when the grate frame 84 is in the raised position, the outer end of grate bar 96 lies on top of main bar 86. When the main bar 86 is in its lowered position, the end of the grate bar 96 is free, as seen in FIG. 9. When free, the cover 98 may be easily slid onto the grate bar 96. When the main bar 86 is in its raised position, it supports the outer end of the grate bar 96 and retains the cover 98 in place. When the main bar 86 is down, a cover is placed on each of the grate bars and then the main bar is raised so that the grate 74 can be put into a grill and used. After use, the grate 74 is removed from the grill, the main bar 86 is lowered, and the covers 98 are removed. New covers are placed on the grate bars, and then the main bar 86 is raised for reuse. Each of the grate bars and other bars of the grate are conveniently of solid rod of circular section. Attachment is conveniently made by spot-welding. Often such grates are chrome-plated. In this way, a grill grate is created and covers are furnished for the grate bars so that cleanliness in food preparation and easy cleanup are provided.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A grill grate and cover comprising:
   a grill grate having a frame and having grate bars, said grate frame being formed of first and second grate frame portions, said first and second grate frame portions being hinged together so that in a first position they are in the same plane and in a second position said grate frame portions are at an angle with respect to each other;
   each of said grate bars having a first and second end, each of said grate bars being attached to said frame at its second end, said first end of said grate bars being free of said frame; and
   a plurality of tubular grate bar covers on a corresponding plurality of said grate bars so that said tubular grate bar covers can be installed on said first end of said grate bars and removed therefrom, each said grate bar cover being shorter than the grate bar on which it is installed and being heat-resistant and substantially non-toxic.

2. The grill grate and cover of claim 1 wherein in said first position said first end of said grate bars are obstructed and in said second position said first end of said grate bars are free for the installation and removal of said grate bar covers.

3. The grill grate and cover of claim 2 wherein said second end of said grate bars is secured to said second portion of said grate frame and in said first position of said grate frames, said first end of said grate bars lies against said first portion of said grate frame.

4. The grill grate and cover of claim 3 wherein there is a stop interengaging between said first and second grate frame portion to limit rotation of said first grate frame portion with respect to said grate frame portion to a point where said first grate frame portion is in contact with said first ends of said grate bars.

5. The grill grate and cover of claim 4 wherein said first and second portions of said grate frame form a circular grate frame.

6. The grill grate and cover of claim 4 wherein said first and second portions of said grate frame form a rectangular grate frame.

7. The grill grate and cover of claim 4 wherein each said cover is made of material which resists destruction at food-grilling temperature and is substantially non-toxic.

8. The grill grate and cover of claim 7 wherein each said grate cover is shorter than the grate bar on which it is installed.

9. The grill grate and cover of claim 8 wherein each said cover is made of aluminum.

10. A grill grate and cover comprising:
    first and second grill grate portions, said first and second grill grate portions being hinged with respect to each other said that they can be moved from a first position where they are planar with respect to each other to a second position where said first and second grate portions lie at an angle with respect to each other, at least one stop interengaging between said first and second grate portions to limit said first and second grate portions to a second angular position only on one side of a planar first position;
    a plurality of grate bars each having a first and second end, said second ends of said grate bars being secured to at least one of said grate frames while said first end of said grate bars is free of said grate frames, said grate bars lying spaced from each other and substantially parallel to each other, said grate bars being positioned so that when in said first position, said first ends of said grate bars are inaccessible and when in said second position said first ends of said grate bars are accessible; and
    a plurality of cover tubes, each for installation on one of said grate bars so that said cover tubes can be installed when said grate frame is in its second position and are retained on said grate bars when said grate frames are in said first position, said cover tubes being heat-resistant and non-toxic.

11. The grill grate and cover of claim 10 wherein a plurality of said grate bars each has its second end secured to one of said grate frames so that said first ends of said grate bars are directed toward each other.

12. The grill grate and cover of claim 11 wherein there is at least one crossbar across said grate adjacent said hinges to support said first ends of said grate bars when in said first position.

13. The grill grate and cover of claim 12 wherein there are two said crossbars, one secured to each said frame portion and one on each side of said hinges.

14. The grill grate and cover of claim 11 wherein said grate bars are attached on said second ends thereof to said second grate frame and said first ends of said grate bars lie on said first portion of said grate frame when said grate frame is in its first position.

15. The grill grate and cover of claim 14 wherein said grate is circular.

16. The grill grate and cover of claim 14 wherein said grate is rectangular.

* * * * *